United States Patent
Simpson et al.

(10) Patent No.: US 7,168,269 B2
(45) Date of Patent: Jan. 30, 2007

(54) GAS INJECTION FOR GLASS MELTING FURNACE TO REDUCE REFRACTORY DEGRADATION

(75) Inventors: Neil George Simpson, Sylvania, OH (US); John R. LeBlanc, Roanoke, VA (US); Gregory Floyd Prusia, Holland, OH (US)

(73) Assignee: The BOC Group, Inc., Murray Hill, NJ (US)

( * ) Notice: Subject to any disclaimer, the term of this patent is extended or adjusted under 35 U.S.C. 154(b) by 547 days.

(21) Appl. No.: 10/208,239

(22) Filed: Jul. 30, 2002

(65) Prior Publication Data

US 2003/0024271 A1    Feb. 6, 2003

Related U.S. Application Data

(63) Continuation-in-part of application No. 09/798,826, filed on Mar. 2, 2001, now Pat. No. 6,705,117, which is a continuation-in-part of application No. 09/374,921, filed on Aug. 16, 1999, now Pat. No. 6,422,041.

(60) Provisional application No. 60/309,528, filed on Aug. 2, 2001.

(51) Int. Cl.
*C03B 5/167*   (2006.01)
*C03B 5/237*   (2006.01)

(52) U.S. Cl. .................... 65/134.6; 65/134.1; 65/134.4

(58) Field of Classification Search ............... 65/134.1, 65/134.4, 134.5, 134.6, 135.1, 135.2, 135.8, 65/136.1, 136.2, 136.3, 335, 347, 355, 356; 432/20, 31, 159, 10, 182; 110/331–5; 431/8, 431/10

See application file for complete search history.

(56) References Cited

U.S. PATENT DOCUMENTS

| 3,238,030 A | 3/1966 | O'Connell et al. |
| 3,240,581 A | 3/1966 | O'Connell et al. |
| 3,734,701 A * | 5/1973 | Pecoraro et al. ............... 65/27 |

(Continued)

FOREIGN PATENT DOCUMENTS

CA    851103    0/0000

(Continued)

OTHER PUBLICATIONS

EPO Search Report (EP 00 30 6970); Date of Completion—Dec. 12, 2002; By The Hague; Examiner A. Reedijk.

(Continued)

*Primary Examiner*—Eric Hug
(74) *Attorney, Agent, or Firm*—Joshua L. Cohen (57) ABSTRACT

A glass melting furnace has a gas inlet positioned proximate to a charging section oxy-fuel combustion region to introduce gas into the region and to at least partially displace gas having a partial pressure of alkali vapor from the region, and optionally a gas outlet is adapted to provide an exit for a volume of furnace atmosphere. A method for reducing alkali vapor corrosion of glass furnace refractory structures includes providing a gas inlet proximate to the oxy-fuel combustion region; introducing a volume of gas from the inlet into the region, displacing a volume of gas having a partial pressure of alkali vapor from the region; and, optionally providing a gas outlet adapted to provide an exit for a volume of furnace atmosphere.

8 Claims, 2 Drawing Sheets

U.S. PATENT DOCUMENTS

| | | | |
|---|---|---|---|
| 3,811,853 A | 5/1974 | Bartholomew et al. | |
| 3,837,832 A | 9/1974 | Pecoraro et al. | |
| 4,297,093 A | 10/1981 | Morimoto et al. | |
| 4,539,035 A | 9/1985 | Burckhardt et al. | |
| 4,675,041 A * | 6/1987 | Tsai | 65/27 |
| 5,116,399 A | 5/1992 | Lauwers | |
| 5,139,558 A | 8/1992 | Lauwers | 65/135 |
| 5,295,816 A | 3/1994 | Kobayashi et al. | |
| 5,411,395 A | 5/1995 | Kobayashi et al. | |
| 5,449,286 A | 9/1995 | Snyder et al. | |
| 5,458,483 A | 10/1995 | Taylor | |
| 5,643,348 A | 7/1997 | Shamp et al. | |
| 5,743,723 A | 4/1998 | Iatrides et al. | |
| 5,795,363 A * | 8/1998 | Pecoraro et al. | 65/134.4 |
| 5,839,890 A | 11/1998 | Snyder | |
| 5,931,654 A | 8/1999 | Chamberland | |
| 6,074,297 A | 6/2000 | Kuchar | |
| 6,123,542 A | 9/2000 | Joshi et al. | |
| 6,210,151 B1 | 4/2001 | Joshi et al. | |
| 6,237,369 B1 * | 5/2001 | LeBlanc et al. | 65/134.4 |
| 6,250,915 B1 | 6/2001 | Satchell et al. | |
| 6,253,578 B1 * | 7/2001 | Kobayashi et al. | 65/134.4 |
| 6,313,057 B1 | 11/2001 | Brown et al. | |
| 6,398,546 B1 | 6/2002 | Kobayashi | |
| 6,422,041 B1 | 7/2002 | Simpson et al. | |
| 6,519,973 B1 * | 2/2003 | Hoke et al. | 65/134.4 |
| 2001/0039813 A1 | 11/2001 | Simpson et al. | |

FOREIGN PATENT DOCUMENTS

| | | |
|---|---|---|
| DE | 2 015 597 | 4/1970 |
| EP | 0 754 912 A2 | 1/1997 |
| EP | 1 078 892 A2 | 2/2001 |
| EP | 1136451 A2 | 9/2001 |
| GB | 1035415 | 7/1966 |
| GB | 1067006 | 4/1967 |
| WO | WO 99/31021 | 6/1999 |

OTHER PUBLICATIONS

EPO Search Report (EP 02 25 1476); Date of Completion—Dec. 13, 2002; By The Hague; Examiner A. Reedijk.

Velez, M., et al. "Degradation of Crown Silica Refractories in Glass Tank Melters", University of Missouri-Rolla, Rolla MO, published for the 61$^{st}$ Conference on Glass Problems, Ohio State University, Columbus, Ohio, Conference Proceedings edited by Charles H. Drummond III, pp. 79-89, Oct. 17-18, 2000.

* cited by examiner

GAS INJECTION FOR GLASS MELTING FURNACE TO REDUCE REFRACTORY DEGRADATION

CROSS-REFERENCE TO RELATED APPLICATIONS

The present application claims priority under 35 U.S.C. §119(e) from U.S. Provisional Patent Application No. 60/309,528, filed on Aug. 2, 2001, and is a continuation in part of U.S. Ser. No. 09/798,826, filed on Mar. 2, 2001, now U.S. Pat. No. 6,705,117, which is a continuation in part of U.S. Ser. No. 09/374,921, filed Aug. 16, 1999, now U.S. Pat. No. 6,422,041.

BACKGROUND OF THE INVENTION

Glass melting furnaces include a refractory surface or superstructure with an interior surface of the superstructure exposed to the harsh heated chemical environment of the furnace. A portion of the superstructure or roof, referred to in the industry as the crown of the furnace, is generally constructed from silica refractory bricks or silica bricks, which are referred to herein also as "bricks." Oxy-fuel burners, used to melt glass-forming materials in alkali-based glass melting furnaces, generate high concentrations of alkali hydroxide vapor in the furnace atmosphere, such as sodium hydroxide (NaOH).

Alkali hydroxides form when water vapor, resulting from the combustion of fuel and oxidant, react with alkali oxides in the glass melt. These alkali hydroxides vaporize out from the molten glass, and can react with the furnace refractory. The alkali hydroxides such as NaOH can corrode the refractory superstructure, particularly where the residence time of the NaOH is unusually long, such that the effects of the NaOH and the partial pressure associated therewith in the closed furnace can compromise the structural integrity of the furnace by corrosion and subsequent melting of the crown of the furnace.

For example, known glass melting furnaces operate at temperatures at which a "glassy phase" can occur on the silica bricks exposed to the atmosphere above the glass being melted within the furnace. The glassy phase of the silica bricks will increase and the viscosity of this glassy phase decrease as the presence and concentration of the alkali, and to some extent water, increases within the atmosphere of the furnace and in contact with the refractory surface.

In addition, the presence of other oxides in the silica, for example, calcium oxide (CaO) and ferric oxide ($Fe_2O_3$) increases the quantity of the liquid phase formed on the silica bricks. Thereafter, a silica-saturated liquid phase will occur and "run" along the surface of the existing bricks to form droplets of silica liquid which drip and ultimately flow down the surface of the silica crown. As the residence time of the NaOH increases, and concurrently the concentration of the alkali increases, the liquid phase will continue to dissolve more of the silica bricks in the furnace refractory superstructure, and will ultimately erode and compromise the furnace crown structure.

Such disadvantages of the alkali presence are known and disclosed in a publication entitled "Degradation of Crown Silica Refractories in Glass Tank Melters," M. Velez et al., University of Missouri-Rolla, Rolla, Mo., published for the 61st Conference on Glass Problems, Ohio State University, Columbus, Ohio, Oct. 17–18, 2000, (Conference Proceedings edited by Charles H. Drummond III), pages 79–89. The corrosion resistance of the silica bricks is reduced under conditions where oxy-fuel melt applications are employed in the furnace.

It is therefore desirable to have a glass melting furnace constructed to purge or exhaust the NaOH, or at the least substantially reduce the residence time of the NaOH at the refractory superstructure so that during the high heat melting of the glass product, the silica bricks which comprise the crown of the furnace are not corroded.

SUMMARY OF THE INVENTION

The present invention relates to glass melting furnaces constructed or modified, and operated to reduce the detrimental effects of alkali vapor from sodium (Na), potassium (K) and lithium (Li), such as sodium hydroxide (NaOH), upon furnace refractories in a region of the furnace, such as the melting zone.

In one embodiment, the present invention provides a gas injection system and method for a glass melting furnace to reduce corrosion of silica refractories by evacuating alkali vapors, such as NaOH, or substantially reducing the residence time of any alkali at the refractory superstructure.

In one embodiment, the present invention provides a gas injection system and method for a glass melting furnace wherein hot gas is introduced into the high alkali concentration environment of the furnace to dilute the partial pressure and concentration of the alkali in the furnace which is in contact with the silica refractories of the furnace.

In another embodiment, the present invention provides a gas injection system and method for a glass melting furnace which injects a selected amount of hot gas, such as heated air, into the furnace and displaces a corresponding volume of the NaOH rich vapor from a region proximate the oxy-fuel burners of the furnace; in one embodiment, exhausting a corresponding volume of the furnace atmosphere from the furnace interior.

In another embodiment, the present invention provides a gas injection system and method for a glass melting furnace, wherein the hot gas for the system originates from exhaust gases provided from a different part of the furnace or from a separate gas source.

The present invention provides distinct advantages over known furnaces having the high alkali concentration environment and the disadvantages associated therewith by i) substantially reducing or diluting the concentration of the alkali vapor, such as NaOH, in the furnace, ii) providing movement and displacement of gases in the furnace thus reducing residence time of the alkali vapor in the oxy-fuel zone and the associated stagnation and deleterious effects associated with the corrosive aspects of alkali hydroxides, such as NaOH, and iii) providing a glass melt furnace construction that promotes the homogenization of the high alkali vapor concentration oxy-fuel region gases with lower alkali vapor concentration gases, optionally from a non-oxy-fuel or air-fuel region or zone.

The present invention therefore provides a glass melting furnace having an upstream melting zone; a downstream fining zone; a charging section in the melting zone; at least one oxy-fuel fired burner disposed in the melting zone proximate the charging section to provide an oxy-fuel combustion region; at least one gas inlet positioned proximate to the oxy-fuel combustion region to introduce a first volume of gas, having no or a dilute partial pressure of alkali vapor, into the oxy-fuel combustion region and at least partially displace a second volume of gas, optionally substantially equal to the first volume, from the oxy-fuel combustion region, the second volume having a higher partial pressure of alkali vapor than the first volume; and, at least one gas outlet adapted to provide an exit for a volume of furnace atmosphere.

The present invention further provides a glass melting furnace having walls supporting a crown substantially enclosing an upstream melting zone and a downstream fining zone; a charging section in the melting zone; at least one oxy-fuel fired burner disposed at the crown above the melting zone proximate the charging section to provide an oxy-fuel combustion region; at least one gas inlet positioned proximate to the oxy-fuel combustion region to introduce a first volume of gas, having no or a dilute partial pressure of alkali vapor, to the oxy-fuel combustion region and at least partially displace a second volume of gas, having a higher partial pressure of alkali vapor than the first volume, proximate the crown in the oxy-fuel combustion region; and, at least one gas outlet adapted to provide an exit for a volume of furnace atmosphere, optionally substantially equal to the first volume.

The present invention also provides a method for reducing alkali vapor corrosion of furnace refractory structures in a glass melting furnace having an upstream melting zone and a downstream fining zone; a charging section in the melting zone; and at least one oxy-fuel fired burner disposed in the melting zone proximate the charging section to provide an oxy-fuel combustion region; comprising: providing at least one gas inlet proximate to the oxy-fuel combustion region; introducing a first volume of gas, having no or a dilute partial pressure of alkali vapor, from the at least one gas inlet into the oxy-fuel combustion region; at least partially displacing a second volume of gas, optionally substantially equal to the first volume, from the oxy-fuel combustion region, the second volume having a partial pressure of alkali vapor higher than the first volume; and, providing at least one gas outlet adapted to provide an exit for a volume of furnace atmosphere.

The present invention also provides a method for reducing alkali vapor corrosion of furnace refractory structures in a glass melting furnace having walls supporting a crown substantially enclosing an upstream melting zone and a downstream fining zone; a charging section in the melting zone; and at least one oxy-fuel fired burner disposed at the crown above the melting zone proximate the charging section to provide an oxy-fuel combustion region; comprising providing at least one gas inlet proximate to the oxy-fuel combustion region; introducing a first volume of gas, having no or a dilute partial pressure of alkali vapor, into the oxy-fuel combustion region; at least partially displacing a second volume of gas proximate the crown in the oxy-fuel combustion region, the second volume having a partial pressure of alkali vapor higher than the first volume; and, providing at least one gas outlet adapted to provide an exit for a volume of furnace atmosphere, optionally substantially equal to the first volume.

BRIEF DESCRIPTION OF THE DRAWINGS

For a more complete understanding of the present invention, reference may be had to the following detailed description of the invention taken in conjunction with the drawings, of which.

DETAILED DESCRIPTION OF THE INVENTION

A typical glass melting furnace 10 provides molten glass to a glass forehearth or refiner 50 in which the molten glass is further refined and subsequently fed to one or more glass-forming machines such as containers, fiberizers, float baths and the like. The glass melting furnace typically includes an elongated channel having an upstream end wall 51 and a downstream end wall 52, side walls 53, a floor and a roof 11, all made from appropriate refractory materials such as alumina, silica, alumina-silica, zircon, zirconia-alumina-silica, chrome oxide and the like. The roof may have an arcuate shape transverse to the longitudinal axis of the channel, however, the roof may be of another suitable design. The roof of the typical glass melting furnace is positioned between about 3 to about 15 feet above the surface of the raw glass-forming material. The glass melting furnace includes two successive zones, a melting zone 54 and a downstream fining zone 55. The melting zone is considered the upstream zone of the glass melting furnace wherein raw glass-forming material is charged into the furnace using a charging device 56 of a type well known in the art. The raw glass-forming material may be a mixture of raw materials typically used in the manufacture of glass. The composition of the raw glass-forming material (or batch) is dependent on the type of glass being produced. Normally, the material comprises, among others, silica containing materials including scrap glass commonly referred to as cullet.

Other glass-forming materials including but not limited to feldspar, nepheline syenite, limestone, dolomite, soda ash, potash, borax, kaolin clay and alumina may also be used. To alter the properties of the glass, a minor amount of arsenic, antimony, sulfates, sulfides, carbon, fluorides and/or other components may also be added. Moreover, oxides of barium, strontium, zirconium and lead may be added for special purpose glass, and other color forming metal oxides may be added to obtain the desired color. The glass-forming materials may include batch oxidizers such as calcium sulfate ($CaSO_4$), sodium nitrate ($NaNO_3$), and potassium nitrate ($KNO_3$) in order to control the redox state of the glass. The raw glass-forming material forms a batch layer of solid particles on the surface of the molten glass in the melting zone of the glass melting furnace.

A recent trend in the glass industry has been to install roof-mounted burners, such as oxygen-fuel burners, in refractory lined glass melters. These burners preferably are directed downwards at an angle greater than 45° with respect to the surface of the glass forming material, and are controlled such that a generally columnar fuel and oxygen flow combusts proximate to the top surface of the glass forming material, to produce a flame that impinges the surface of the raw glass forming material. This permits a significant increase in heat transfer into the glass, while maintaining refractory temperatures within safe operating limits, and avoiding the overheating of the roof and walls of the furnace. This technology approach is described in U.S. Pat.

No. 6,237,369 to LeBlanc, et al. issued May 29, 2001, with respect to using roof-mounted burners as the primary source of heat in a glass melting furnace having no regenerators or recuperators, and in U.S. Pat. No. 6,422,041 to Simpson et al, issued Jul. 23, 2002, with respect to the use of at least one oxygen-fuel burner in the roof of a glass melting furnace to boost production capacity or maintain current production capacity as a result of deterioration of existing heat recovery equipment such as recuperators or regenerators, both patents being incorporated herein by reference as if fully written out below. United States Patent Application Publication No. 2001/0039813A1 to Simpson et al describes at least one staged combustion oxy-fuel burner mounted in the roof of a glass furnace, positioned over the glass-forming batch material entering the furnace, this patent application being incorporated herein by reference as if set out in full, below.

In certain embodiments, the trend involves the replacement of a portion of existing or previously existing air-fuel or electrical energy capacity with oxy-fuel energy. With the exception of end-fired regenerative furnaces and electric furnaces, the process involves the blocking of regenerative ports or isolation of recuperative burners. For example, air-fuel, cross-fired regenerative furnaces have multiple ports, typically three to eight on each side of the furnace, that connect to either a common or compartmentalized regenerator to preheat incoming combustion air. The regenerators, which come in various shapes and sizes, reverse every 15–30 minutes dependent on furnace operation. During each reversal cycle combustion air from a fan passing through one passage in a reversal valve enters the base of the regenerator on one side of the furnace and is preheated prior to entering the ports, which connect to the furnace. Fuel in the form of oil and/or gas is injected either under, over, through or side of port to produce a flame, which is combusted in the glass-melting furnace. The hot products of combustion exit the furnace through the opposing side port, down through the regenerator checker bricks, releasing heat and then exiting to the exhaust stack through a second passageway in the reversal valve. As the incoming combustion air-side regenerator cools, the exhaust regenerator heats until the reversal valve reverses and combustion air enters the previously hot exhaust regenerator. Through time, regenerators can become blocked due to thermal/structural damage and/or carry-over of raw glass forming materials, also known as batch materials or batch, or condensation of volatile species released from the glass batch. As the regenerators start to block or fail, the preheat temperature of the air in the furnace will decrease, and the atmospheric pressure within the furnace will increase, reducing the thermal efficiency of the furnace. To recover production capacity lost due to aging regenerators or to increase production in a non-encumbered furnace, at least one oxy-fuel burner has been installed in such furnaces, between the first port and charging end wall.

The recuperative furnace utilizes at least one recuperator type heat exchanger. Unlike the regenerator, the recuperator is continuous with a hot concurrent flow heat exchanger where exhaust gases preheat combustion air, which is ducted to individual air fuel burners along the sides of the furnace. As with regenerative furnaces, recuperators can start to lose their efficiency and ability to preheat the air. They can become blocked or develop leaks between the walls separating the combustion air and exhaust gases.

The present invention relates to both 100% oxy-fuel glass furnaces and oxy-fuel boosting of air-fuel furnaces with or without the use of regenerators or recuperator heat recovery devices and/or oxygen enrichment. Consequently, the present invention relates to both the modification of existing glass furnaces and newly designed, dedicated purpose glass furnaces. In hot top electric furnace applications of this invention, at least one oxygen-fuel burner may be mounted in the roof of the furnace. In cross-fired regenerative furnaces, applications of this invention may sometimes necessitate at least one pair of the opposing ports to be partially blocked or isolated. In end-fired regenerative furnace applications of this invention, at least one oxygen-fuel burner may be mounted in the roof of the furnace and the combustion air flow will be reduced by a portion of the original design maximum flow. In recuperative furnace applications of this invention, at least one oxygen-fuel burner may be mounted in the roof of the furnace. In multi-burner furnaces, wall mounted burners adjacent to the roof mounted burners should be removed and the air supply at least partially isolated. In single burner or single port applications, the combustion air flow will be reduced by a portion of the original design maximum flow.

Glass melting furnaces of all designs can be boosted using at least one roof-mounted oxygen fuel burner(s) positioned over the raw batch materials as the materials enter the furnace to improve the rate of melting and improve glass quality and/or glass product yield. Because of the increased rate and yield of the glass melting generated by the design and positioning of these burners, depending on furnace condition and type, at least one or more of the following can be achieved: increased glass production, improved rate of melting, improved glass quality, reduction in electric boost, recovery of production lost due to inefficient heat recovery (i.e., blocked regenerators), reduction of oxygen use by replacing oxygen enrichment of the furnace atmosphere, reduction of oxygen use by replacing oxygen lancing, reduction of oxygen use by replacing conventional oxy-fuel burners positioned through the walls of a glass furnace, reduction in furnace superstructure temperature, increased furnace campaign life, improved energy efficiency, reduction in emissions of oxides of nitrogen and oxides of sulfur, reduction in fossil fuel usage, reduction in recycled glass cullet, control of exit glass temperature, and increased product glass yield.

At least one oxy-fuel burner(s) is(are) preferably positioned in the roof (or crown) of the furnace above the raw batch (and optionally, cullet) materials, and directed to the batch surface. The burners may be positioned as close as possible to the batch chargers where the coolest batch materials are, proximate to the furnace back wall where the glass forming material typically is charged, to obtain rapid melting due to the higher thermal difference. Conventional air fuel or oxygen fuel burners may be positioned through the walls of the furnace downstream from the roof-mounted burners to provide a refining zone and insure complete combustion of reactants. Alternatively, oxy-fuel roof mounted burners may provide heat transfer downstream of the batch chargers proximate to the furnace downstream end wall, that is, the front wall of the furnace.

The floating solid batch particles of raw glass-forming material are melted principally by the at least one oxygen-fuel burner mounted at or within the roof of the glass melting furnace. It will be appreciated that it has been found that the installation and proper control of at least one oxygen-fuel burner in the roof of the glass melting furnace over the raw glass-forming material increases the melting rate of the solid raw glass-forming material and, at the same time, maintains the operating temperature of the surrounding refractory material within acceptable operating limits.

As used herein, the phrase "at least one oxygen-fuel burner" means one or more oxygen fuel burners. Also as used herein, by 100% oxy-fuel is meant that all burners are adapted to utilize oxygen or oxygen enriched air, as contrasted to air alone, as the oxidant. Furthermore, as used herein the phrase "principally by at least one oxygen-fuel burner" refers in retrofit installations, to the condition wherein the additional or recovered glass production capacity and replaced air-fuel and or electric/oxygen boost energy for melting of the raw glass-forming material results from the use of at least one oxygen-fuel burner. In one preferred embodiment, the glass melting furnace includes three oxygen-fuel burners. A single oxygen-fuel burner is positioned upstream of two adjacently positioned downstream oxygen fuel burners. However, it will be appreciated that any number of oxygen-fuel burners may be positioned at almost any suitable location in the roof of the furnace over the batch to melt the raw glass-forming material. For example, two oxygen-fuel burners may be positioned in a side-by-side relation or a single oxygen-fuel burner may be used.

The angular orientation of each oxygen-fuel burner in the roof of the glass melting furnace may be such that the flame produced is directed substantially perpendicular to the glass batch surface to produce a flame which impinges on the glass surface. In a preferred embodiment, the oxygen-fuel burners are positioned substantially perpendicular to the batch material at an angle of about 90 degrees relative to the raw glass-forming material. The angle may deviate from the perpendicular in the direction of the downstream end-wall (i.e., the front wall) in some embodiments by as much as 45 degrees, but preferably less than 10 degrees.

A further embodiment of this invention relates to the use of at least one oxygen-fuel burner that utilizes internal or external combustion staging, positioned in the roof of a glass-melting furnace. This embodiment applies both to 100% oxygen-fuel fired furnaces and to furnaces heated by electric or non-oxygen-fuel (such as air-fuel burner) means. The application to oxygen-fuel fired furnaces provides an increased rate of melting, resulting in at least one of an improvement in glass quality, glass production capacity and energy efficiency (by reduction in either fossil fuel- or electro-boost) per unit output of glass. The application of the present invention to non-oxygen fuel furnaces permits one to improve glass quality, and to boost production capacity or maintain current production capacity with either reduction of electro-boost or despite the deterioration of existing heat recovery equipment. In retrofit installations, the process involves the supplement or replacement of a portion of existing or previously existing oxygen-fuel, air-fuel or electric energy capacity with oxy-fuel energy through at least one oxygen fuel burner with integral or external combustion staging located in the roof of the furnace.

In the glass furnaces for which the present invention is intended, a typical burner discharges a mixture of fuel and either air or oxygen in a particular ratio of fuel to oxidant, to produce a combustible mixture. Once ignited, this combustible mixture burns to produce a flame that is used to heat and melt the glass batch materials. The process of the present invention differs from that utilized in conventional fossil fuel fired air fuel and oxy-fuel furnaces, where heat transfer is effected principally by radiation directly from the walls and roof of the furnace and direct radiation from the flames. The process utilizing at least one roof mounted oxy-fuel burner(s), in addition to a radiation heat transfer component, provides significant convective heat transfer due to the impingement and final reaction of reactive intermediate species such as carbon monoxide, hydrogen, and hydroxyl radicals, to stable combustion products such as carbon dioxide and water vapor at the glass batch surface. This type of heat transfer is enhanced when the oxy-fuel burner is either integrally (within the burner block) or externally staged, so as to delay a portion of the combustion, thereby lowering flame temperature and radiant heat losses until the glass surface is reached. As a result, heat transfer to the furnace superstructure is reduced.

Suitable fuels for combustion include, but are not limited to, methane, natural gas, liquefied natural gas, propane, liquefied propane gas, butane, low BTU gases such as town gas, producer gas or the like, vaporized or atomized oil, kerosene or diesel, or mixtures thereof, at either ambient temperature or in preheated form. Preferred oxidants include oxygen-enriched air, containing greater than 20.9 volume percent oxygen to about 80 volume percent, preferably greater than 50 volume percent, such as produced by filtration, absorption, membrane separation, or the like; non-pure oxygen such as that produced by, for example, a vacuum swing adsorption process and containing about 80 volume percent to about 95 volume percent oxygen; and "industrially" pure oxygen containing about 90 volume percent to about 100 volume percent oxygen, such as is produced by a cryogenic air separation plant. The oxidant may be introduced at either ambient temperature or in preheated form. The fuel and the oxidant are generally introduced in the furnace through a burner assembly.

The burner assembly generally includes a burner block formed to include a flame chamber having inlet and outlet openings, burner means for discharging fuel into a flame chamber formed in the burner block and means for discharging oxygen into the flame chamber. In operation, discharged oxygen mixes with fuel provided by the discharging burner means inside the flame chamber. This combustible fuel and oxygen mixture can be ignited to define a flame having a root portion in the flame chamber and a tip portion outside the flame chamber. If the burner assembly to be used comprises an "internally staged" burner for secondary combustion purposes, the burner block may further include bypass means for conducting oxygen outside of the flame chamber, such as to oxygen-discharge ports around the outlet opening of the flame chamber. In operation, oxygen may pass through the bypass means formed in the burner block to the oxygen-discharge ports, and be ejected from the burner block into a downstream "second-stage" region containing a portion of the flame and lying outside the flame chamber in the furnace, to heat the glass batch materials or melt.

In certain preferred embodiments, the integrally staged burner block is made of a refractory material and includes an outside wall formed to include the flame chamber inlet opening and a plurality of oxygen-admission ports around the inlet opening. The burner block also includes a furnace wall configured to lie in a furnace and formed to include the flame chamber outlet opening and the plurality of oxygen-discharge ports around the outlet opening. In alternative embodiments, one or more oxidant entry means can be provided externally to the burner block, as described below, to enable staged combustion to be effected in the furnace. Suitable materials for the refractory burner block include but are not limited to silica, mullite, zirconia ($ZrO_2$), fused cast alumina-zirconia-silica (AZS), rebonded AZS, or bonded alumina ($Al_2O_3$). The particular material chosen is determined, in part, by the type of glass to be melted in the glass furnace.

Staged combustion has been proposed for glass furnace burners, such as those in which a fuel rich oxy-fuel mixture is injected into the furnace from a burner, and additional oxygen is injected by means external to the burner block in order to provide complete combustion displaced from the burner exit. In the instance of roof-mounted burners, preferably complete combustion would occur in the proximity of the surface of the raw batch materials. Preferably, additional oxygen injectors would be positioned to delay complete combustion until after the flame has impinged on the surface of the raw batch. The location of the additional injectors is dependant upon the desired operating conditions of the burner(s), as well as burner location and number. According to the present invention, externally staged combustion is preferably provided by installing at least one oxygen injector means in the roof or crown of the furnace, although oxygen injectors may be positioned elsewhere in order to obtain the desired delayed combustion effects.

The roof mounted oxy-fuel burner is successful according to the present invention, because a portion of the combustion occurs on the batch surface of the glass melter, which adds convective heat transfer to the traditional radiative heat transfer. Further in accordance with the preferred embodiment of this invention, use of roof mounted oxy-fuel burners provided with integrally or externally staged combustion, delays mixing the oxygen and fuel to project the combustion zone farther away from the roof. This results in localizing more of the combustion on or at the surface of the glass raw batch or melt materials to increase the convective heat and radiative heat transfer. The high temperature flame is moved away from the roof to avoid damaging the structure, and nearer to the glass to promote heat transfer. One additional advantage is that the inventive roof mounted staged combustion embodiment allows the process to operate in furnace constructions that have higher roofs. The delay is created by separating the two gas flows (either oxygen only/fuel only, or a fuel-lean/fuel-rich mix) by a sufficient amount, and in one embodiment, angling them toward each other to have their flow center lines converge on the batch or melt surface.

Oxygen/natural gas burners operate at a stoichiometric ratio of 2:1 when the natural gas is pure methane and the oxidant is pure oxygen. The conventional conical flame oxygen/gas burner uses a concentric tube-in-tube construction with the inner tube supplying the gas and the outer tube supplying the oxygen. The flame length then becomes a function of the velocity of the two flows and the relative velocity differences between the two flows, which will affect the mixing rate at the interface between the two streams and therefore the rate of combustion. Because both streams will expand as they exit the tubes, they will begin to mix immediately and combustion will start very close to the burner discharge point.

Staged combustion separates the two flows (fuel and oxidant) into two or more separate streams. In one embodiment, a fuel gas stream can be operated as a gaseous fuel only or as a concentric tube burner with a less than the stoichiometric ratio of oxygen. The remaining oxygen required for complete combustion, optionally up to 100% of the required oxygen, is introduced through one or more additional tubes that are located away from the gas tube far enough that the two streams do not mix until they have traveled a substantial distance to the target, glass materials surface. The angle that separates the two streams can be as low as 0° (parallel), or as high as 90° if projected through the walls of the furnace, and up to 180° if bubbled from beneath the surface of the melt, as long as the mixing occurs beyond the burner discharge point.

One advantage of staged combustion according to the present invention is the ability to operate the roof mounted burner farther away from the target, i.e. have a greater distance from the roof to the glass material surface. This allows the roof mounted oxy-fuel burner(s) to operate in existing furnace designs, where the roof is currently too far from the batch for a non-staged roof mounted burner to achieve any significant rate of convective transfer.

The at least one oxygen-fuel burner requires fuel and an oxidant. The fuel can be either gaseous or liquid or combinations of both. Gaseous fuels include those listed above, as well as blends of the aforementioned gases. Liquid fuels include heavy, medium and light fuel oils, kerosene and diesel. Liquid fuels are required to be atomized and/or vaporized. The atomization can be either by mechanical means or secondary atomizing mediums which include air, steam, oxygen, any of the aforementioned gaseous fuels and in some cases an inert gas. Vaporization relies on the heat of the surrounding products of combustion gases to evaporate the oil. The oxidant can be either 100% pure oxygen or a blend of oxygen and inert gas with an oxygen concentration of preferably 50–100%, as described above.

The temperature of the flame imparted by an oxygen-fuel burner is dependent on the quality of the fuel and the oxygen/fuel ratio. In a preferred embodiment, the oxygen concentration of the oxygen-fuel burner is typically at a level of about 95–125 percent of the stoichiometric amount of oxygen required to combust the fuel. The fuel to oxygen ratio can be varied, however, to produce a range of operating conditions in the glass melting furnace to effect one or more desired properties, including, for example, redox level, glass color, the level of gaseous bubbles known as seeds and blisters in the trade and other glass properties.

The NaOH concentration near the crown of an oxy-fuel fired furnace is relatively high as compared to an air-fuel, cross fired furnace. In oxy-fuel firing, nitrogen contained in air-fuel combustion product gas is substantially reduced or is absent, and the volume of the combustion is typically reduced to one third or one quarter of that of a conventional air-fuel fired furnace. Thus the concentrations of alkali species in the furnace atmosphere would increase three to four times as compared to the same amount of volatile alkali species generated in conventional air-fuel firing.

In a preferred embodiment of the invention, at least one oxy-fuel burner, most preferably at least one roof-mounted oxy-fuel burner, is located in the melting zone of the glass melting furnace, as close as is practicable to the charging end. In order to provide the benefits of reduction of refractory brick corrosion and structure degradation according to the invention, at least one gas inlet is positioned in the furnace near this region where oxy-fuel combustion takes place, in order to permit an effective volume of gas to enter the region. While not intending to be limited by theory, it is believed that the introduction of the gas acts in part by diluting the concentration or partial pressure of alkali vapor localized in the furnace atmosphere in the oxy-fuel combustion region, and also displaces a given volume of the alkali vapor-rich gaseous furnace atmosphere that would otherwise be partially entrained near the furnace crown, to another area of the furnace. An exhaust is optionally provided to remove up to an equal volume of relatively alkali vapor-rich furnace atmosphere (for example, furnace atmosphere having a partial pressure of alkali vapor) from the furnace as is introduced by the gas inlet in the oxy-fuel fired melting zone.

The gas inlet can be any type normally associated with glass melters, such as a conduit, pipe, fan, injector and the like. In one embodiment in which a glass melting furnace contains a regenerator or a recuperator having a plurality of ports and an oxy-fuel burner is provided in the melting section to boost or replace energy input from the regenerator or recuperator, at least one port of the regenerator or recuperator is maintained at least partially open to provide the gas inlet, and heated gas, preferably air, is introduced through the partially open port. Preferably, the first and/or second port, closest the charging end, is left partially open to provide the gas inlet. If the gas inlet is provided by a partially open port of a regenerator, the direction of the flow of gas into the melting zone and the exhaust of furnace atmosphere from the melting zone preferably reverses periodically to the opposing sides of the port in the furnace. In addition to exhausting through a partially open port of a regenerator, or alternatively, the exhaust for the furnace atmosphere can be any suitable type of opening, conduit or stack useful in glass melting furnaces, located in the roof or walls of the upstream melting zone or a downstream section of the melter or in the refiner. The exhaust may be fan-assisted, an ejector, or natural draft, and may lead to a device for treating the furnace exhaust gases.

The gas introduced into the oxy-fuel combustion region of the melting zone may be any gas that is not corrosive or reactive with the refractory bricks of the furnace structures. The gas introduced into the oxy-fuel combustion region of the melting zone may be an inert gas such as nitrogen, but preferably is air that is reactive with fuel used in the combustion process, or alternatively may be (industrially pure) oxygen, oxygen-enriched air, steam, carbon dioxide, or the product of combustion from a non-oxy-fuel fired region of the furnace, as well as mixtures of the preceding. The gas should, however, have either no partial pressure of alkali vapor, or a lower partial pressure of alkali vapor than the furnace atmosphere in the oxy-fuel combustion region.

The gas may be introduced at ambient temperature, but preferably is heated to a temperature range so as not to interfere with the heating or maintenance of the temperature of the glass bath. To prevent undesired formation of NOx, the use of nitrogen is preferably limited. The stoichiometric oxygen and fuel ratios and flow characteristics of the oxy-fuel burners, remaining air-fuel burners, if any, and air or oxygen introduced into the charging section of the upstream melting zone to reduce alkali vapor corrosion, can be controlled so as to minimize the emission of nitrous oxide and sulfur dioxide from the glass furnace. For example, the oxy-fuel burner(s) can be operated with sub-stoichiometric oxygen, that is, fuel rich, to compensate for air or oxygen from the inlet gas that may participate in the combustion reaction in the melting zone, and in one embodiment, in an externally staged manner with respect to the oxy-fuel burner(s). In another embodiment, furnace atmosphere gases dilute in alkali vapor, such as exhaust gases from an air-fuel fired region downstream of the charging end and melting zone, may be directed by any suitable means to dilute the alkali vapor concentration in the oxy-fuel combustion region of the melting zone by inducing mixing of the downstream furnace atmosphere gases with oxy-fuel combustion region alkali vapor rich gases.

In one embodiment of the invention, corrosion of the furnace crown refractories is reduced by sweeping the furnace crown in the oxy-fuel combustion region with the gas, having no partial pressure or a low partial pressure of alkali vapor relative to the furnace atmosphere in that region, introduced from the gas inlet and/or with gas displaced by the gas introduced from the inlet.

In a preferred embodiment, the present invention is carried out in conjunction with staging combustion in the melting zone by at least one of internal burner staging, external burner staging using an oxidant injector in the furnace roof or wall, and/or introducing oxygen or air from the gas inlet in or near the oxy-fuel combustion region.

SPECIFIC EMBODIMENTS OF THE INVENTION

EXAMPLE 1

Retrofit with Roof Mounted Oxy-Fuel Burners

One demonstration of this invention was the oxygen boosting, 100% oxygen conversion, re-conversion to oxygen boost and finally conventional air fuel firing of an existing hot three-port cross-fired regenerative furnace. The furnace was initially firing all air fuel. Port One firing was replaced with at least one roof mounted oxygen fuel burner. The furnace fired conventionally air fuel regenerative on the remaining two ports. In the second phase, Port Two firing was then replaced with at least one roof mounted oxy-fuel burner and the furnace fired conventionally air fuel regenerative on the third port. In the third phase, Port Three firing was replaced with energy in the already installed roof-mounted oxy-fuel burners. The furnace capacity was increased from 55 to 85 tons per day with reduced energy input from 23.5 mm BTU/hr to 18 mm BTU/hr. The furnace was re-converted to air fuel firing in incremental stages. This example demonstrates the ability to selectively boost an existing air fuel furnace as well as to provide total heat input for a glass furnace from roof-mounted oxy-fuel burners. The process does not require water-cooled burners.

EXAMPLE 2

Burner and Burner Block with Integral Oxygen Staging

An oxy-fuel burner provided with integral staging of oxygen, by means of the burner configuration or the burner in combination with the burner block, has been shown to provide increased heat transfer and reduced NOx. According to the present invention, at least one of this type of integrally staged burner is provided in the roof of a glass melting furnace. The burner is ideally positioned over the raw batch materials and is preferably angled such that the angle alpha ($\alpha$ being the angle of the axis of the burner in the direction of firing to the horizontal plane of the furnace or melt) equals about 91° to about 135° in the direction of the glass flow in the furnace.

EXAMPLE 3

A Burner and Burner Block with External Oxygen Staging

It has been shown that a burner with burner block mounted in the roof of a glass melting furnace with 2–8 oxygen injectors external to the burner and block can produce higher heat transfer than a non-staged burner. The burner is preferably angled from about 91° to about 135° relative to the surface of the glass and in the direction of the glass flow in the furnace. According to this example, 0% to about 90% of the stoichiometric combustion oxygen is injected through the primary oxygen burner, and the remaining 100% to about 10% secondary combustion oxygen is injected through the oxygen injectors, which are angled from about 0° to about 90° relative to the surface of the glass. As it can be appreciated by one skilled in the art, the number, angle and amount of staging ports is designed specifically for each furnace, in order to delay the combustion of the fuel until it impinges on or near the surface of the raw glass batch materials.

EXAMPLE 4

Inter-Burner Staging Between at Least Two Roof Mounted Burners

The staging of combustion utilizing oxy-fuel burners can be accomplished according to the invention by inter-burner staging, between at least two roof mounted burners. One of the burners is operated at sub-stoichiometric levels, that is, in a fuel-rich mode, and the second or additional burner(s) is run with the balance of the oxygen required for complete combustion, that is, in a fuel-lean mode. Experimentation was conducted on the boosting of a conventional air fuel regenerative glass furnace, where two of the rear burners were operated in a fuel lean mode, while the upstream, roof mounted oxy-fuel burner was operated in a fuel rich mode. This mode of operation produced an oxy-fuel lean zone, adjacent to an oxy-fuel rich zone, followed by an air-fuel lean zone. The result of operating the glass furnace according to this method was to increase furnace capacity while reducing the emissions of oxides of nitrogen on a per ton basis. This method of inter-burner staging can also be applied in conjunction with the two previously detailed staged combustion embodiments.

EXAMPLE 5

Staging Combustion in a Glass Melting Furnace with Oxygen Bubblers

One method of staging combustion according to the invention involves the use of oxygen bubblers in conjunction with at least one roof mounted burner. Oxygen bubbling has been used for several glass manufacturing applications, such as to mechanically promote the convection currents within the molten glass. Oxygen is soluble in glass, and under normal operating conditions only a small amount (less than 5% of stoichiometric) of oxygen is injected into the glass. By positioning at least one roof mounted oxy-fuel burner above a single oxygen bubbler, or a row or bundle of bubblers, it is possible to operate the roof mounted oxy-fuel burner(s) under stoichiometric or sub-stoichiometric conditions, and supply the remainder of combustion oxygen via bubblers located in the floor of the glass melter. This enhances the availability of oxygen at the glass surface for secondary combustion of fuel or partially oxidized combustion products or reactive intermediates.

EXAMPLE 6

Oxy-Oil Burners

Conventional oil and oxygen oil burners for glass melting furnaces rely on the combustion of oil drops which have been atomized by either twin fluid atomizers (using steam or compressed gas) or mechanical atomizers (using either pressure or rotational energy). The flame shape is governed by the thrust of the spray and the size of the droplets. Conventional oxy-oil burners would release a high proportion of the heat in the near roof position.

In one oxy-oil burner design, the majority of the combustion oxygen (greater than about 60%) is injected by at least 2 nozzles, or a plurality of nozzles up to a concentric ring set apart from, yet substantially surrounding the oil stream, to a point beyond the initial non visible combustion zone of the oil spray. The centerline of these nozzles is preferably angled about 45° to about 101° from the horizontal. This staging of the oxygen produces reactive intermediate species, and delays complete combustion until it impinges on or near the raw batch materials. The remaining oxygen can be injected immediately adjacent and concentric to the oil stream, such as via the atomizing medium, via an additional concentric oxygen tube, or by tertiary injection in the furnace such as by an oxygen lance, to achieve complete combustion. This oxy-oil, staged, roof mounted burner minimizes heat release to the roof while maximizing heat transfer to the raw batch, due to the additional convective heat transfer on the surface. The burner may be cooled by a water jacket having an inlet and an outlet.

EXAMPLE 7

Fuel Staged Oxy Fuel Burner

An oxy-fuel burner was designed for use in roof mounted glass melting furnace applications, using fuel staged principles, from one outer oxidant (oxygen) injector and two inner fuel injectors; one central fuel injector being adapted for high velocity injection and one annular fuel injector being adapted for low velocity injection. The injectors preferably comprise at least three concentric tubes. Burner flame length and oxidant-fuel mixing is controlled by a central high pressure fuel jet, which is supplied through tube walls from the first fuel feed, utilizing about 10–90% of the fuel stream. This high velocity, high momentum flow governs the flame shape and the mixing, rather than the lower momentum fuel gas shroud. This gas flow is also higher than that of the oxygen flow, in order to control the mixing. The remaining fuel (about 90–10%) is supplied from the second fuel feed concentrically through at least one annular fuel injector formed by inner concentric tube walls, with the combustion oxygen being supplied from the oxygen feed via an outer annular injector formed by outer concentric tube walls. Sizing of the central high pressure injector governs the rate of mixing due to the high momentum of the jet. The central jet is staged due to the shrouding of the secondary gas streams. This arrangement provides a means of propelling the fuel gas, such as natural gas, and allowing the fuel gas to interact with raw batch and oxygen in a staged manner near the batch surface in a glass furnace application. Optionally, the central high velocity jet may have a lower mass than the low velocity fuel jet, as long as the momentum of the central jet is higher. In one embodiment, the high velocity central jet may comprise a liquid fuel supplied by a liquid fuel burner, such as an oil burner, rather than a gaseous fuel, and the lower velocity fuel shroud may comprise a gaseous fuel.

EXAMPLE 8

Gas Introduction to Reduce Refractory Corrosion

Figure 1:
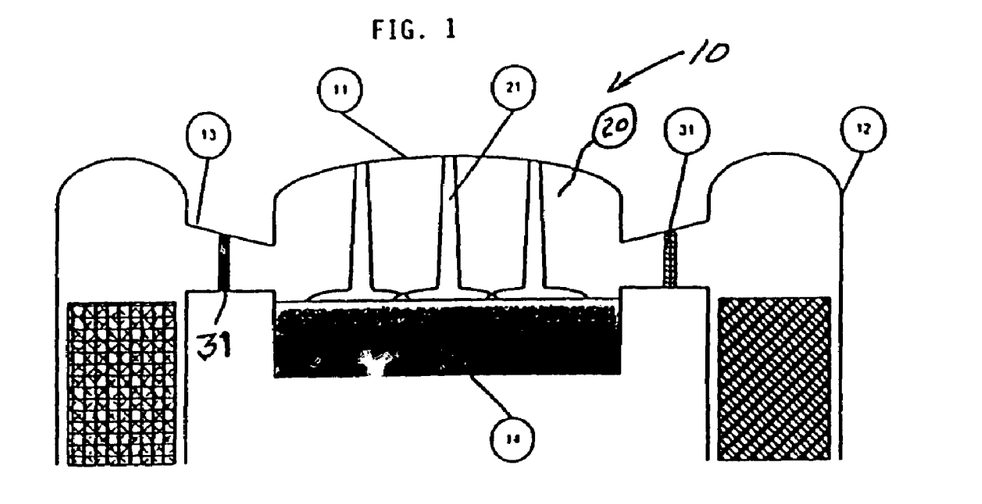
FIG. 1 is a cross-sectional view of an air-fuel cross-fired regenerative glass melting furnace with Port One blocked and using oxy-fuel boosting.
Figure 2:
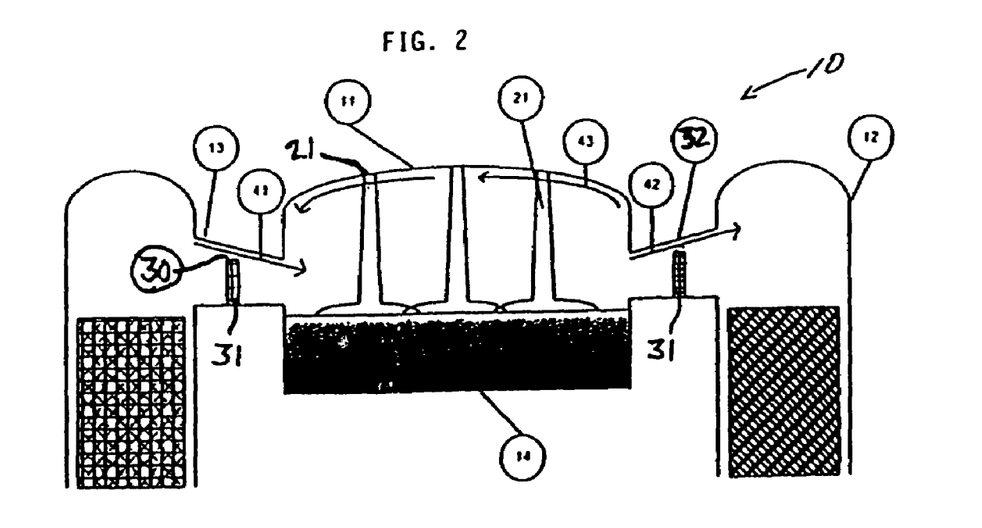
FIG. 2 is a cross-sectional view of an air-fuel cross-fired regenerative furnace having a gas injection system of the present invention and with Port One partially blocked and using oxy-fuel boosting.
Figure 3:
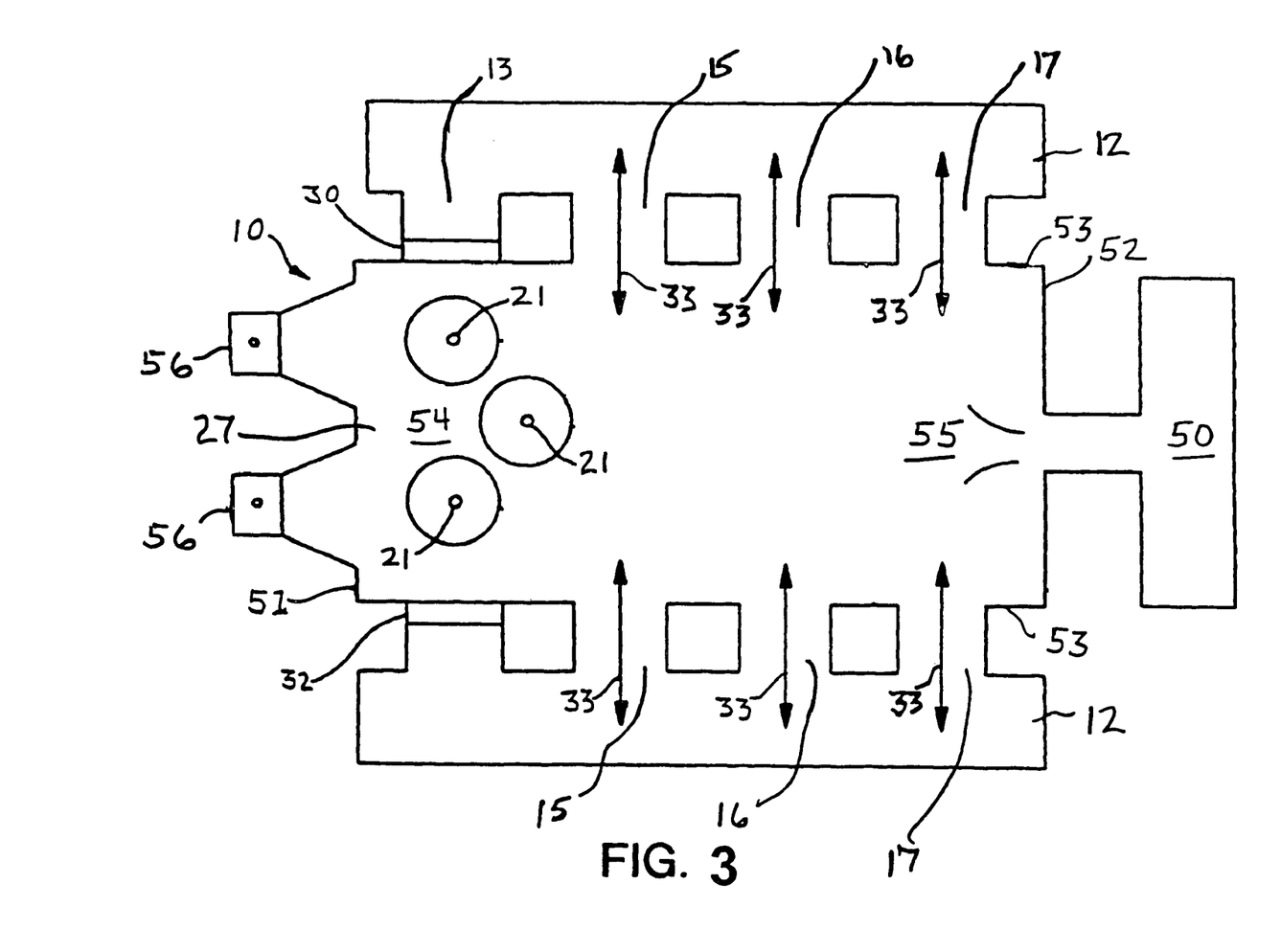
FIG. 3 is a top view of a schematic of an air-fuel cross-fired regenerative glass melting furnace incorporating the present invention and with Port One partially blocked and using oxy-fuel boosting.

Referring to FIGS. 1–3, in order to increase the throughput of a four-port cross-fired regenerative furnace 10 such as shown, Port One 13 was sealed or blocked with brick members 31, such as silica refractory bricks, and three oxy-fuel burners 21 were installed in the charging end 27 of the furnace. Referring to FIG. 1, the oxy-fuel burners 21 were mounted in a roof or crown 11 of the furnace 10. Port One 13 was sealed or blocked with the bricks 31 when the furnace 10 was cool, achieving a substantially airtight seal with respect to an interior 20 of the furnace 10. Regenerators are shown generally at 12.

During operation of the furnace 10, at least fifty percent (50%) of the total energy for the furnace was supplied by the oxy-fuel burners 21 shown in FIG. 3. The raw glass batch was melted in a glass bath 14 at the interior 20 of the furnace 10. The furnace 10 was operated for approximately four months, during which time NaOH corrosion and refractory wetness occurred on the furnace crown and breastwalls in the oxy-fuel fired charging section of the furnace 10, proximate to Port One 13.

The corrosion and corrosive effect were visibly halted within hours upon removal of approximately ten percent (10%) of the brick members 31 which sealed Port One 13 to provide a passage 30 as shown in FIG. 2. This occurred at the firing side of the furnace by providing hot air via Port One as shown by the arrow 41, to move across the furnace crown 11 and thereby reduce the partial pressure and concentration of NaOH in contact with refractory surface of the crown. It is to be noted that in this Specification, reference to NaOH is by way of example and not limitation, as the present invention reduces the corrosive effects of other alkali vapors as well.

The non-firing side of furnace 10 was provided with an exhaust in passage 32 to facilitate removal of furnace atmosphere gas as shown by the arrow 42 and the entrained high concentration of the NaOH through passage 32, thereby to allow a lesser amount of alkali vapor to remain in the furnace to further dilute the NaOH concentration in the oxy-fuel fired environment.

With respect to FIG. 3, the burners 21 were disposed proximate the charging end 27 of furnace 10. Depending upon burner placement, corrosion typically occurs in those furnaces not having the inventive structure of the present invention within the first twenty-five to fifty percent (25% to 50%) of the furnace at the charging end.

As shown in FIG. 3 with respect to regenerator Ports Two 15, Three 16, and Four 17, arrows 33 indicate the periodic reversal of gas flow through the regenerators. The invention provides for the reversal of gas flow at Port One as well. In the reverse cycle, the flow of gas 41 injected through passage 30 at one side of Port One and the gas flow 42 exhausted through passage 32 at the opposing side of the furnace can be alternated or reversed so that the hot gas can be injected at passage 32 generally to form a gaseous sweep as shown by the arrow 43 of the crown 11, and furnace atmosphere gases can be exhausted at passage 30.

Glass melting furnaces are constructed or modified, and operated to reduce the detrimental effects of alkali vapor, such as sodium hydroxide, upon furnace refractories in the melting zone of the furnace. A volume of the gas, preferably heated air, introduced into the high alkali concentration environment of the furnace dilutes the partial pressure and concentration of the alkali vapor that is in contact with the furnace refractories, displaces a substantially corresponding volume of gas rich in alkali vapor from the furnace melting zone containing oxy-fuel burners; and optionally exhausts a substantially corresponding volume of alkali vapor-containing furnace atmosphere from the furnace interior.

Although the invention has been described with reference to certain preferred embodiments, it will be appreciated that many variations and modifications may be made consistent with the broad principles of the present invention. It is intended that the preferred embodiments and all such variations, modifications and equivalent embodiments be included within the scope and the spirit of the invention as described herein and defined by the following claims.

We claim:

1. A method for reducing alkali vapor corrosion of furnace refractory structures in a glass melting furnace having an upstream melting zone and a downstream fining zone; a charging section in the melting zone; and at least one oxy-fuel fired burner disposed in the melting zone proximate the charging section to provide an oxy-fuel combustion region; wherein the furnace contains a regenerator or a recuperator having a plurality of ports, comprising:
    providing at least one gas inlet proximate to the oxy-fuel combustion region;
    introducing a first volume of gas, having no or a dilute partial pressure of alkali vapor, from the at least one gas inlet into the oxy-fuel combustion region;
    at least partially displacing a second volume of gas, optionally substantially equal to the first volume, from the oxy-fuel combustion region, the second volume having a partial pressure of alkali vapor higher than the first volume;
    providing at least one gas outlet adapted to provide an exit for a volume of furnace atmosphere;
    providing at least partial blockage of at least one port of the regenerator or recuperator and providing at least a partial opening of one port of the regenerator or recuperator to provide the at least one gas inlet.

2. The method of claim 1 including replacing combustion from the at least one at least partially blocked port of the regenerator or recuperator and the at least one at least partially open port of the regenerator or recuperator by operating the at least one oxy-fuel burner.

3. The method of claim 1 wherein the providing at least a partial opening of at least one port of the regenerator or recuperator provides the at least one gas outlet.

4. The method of claim 3 including periodically reversing the direction of flow of the gas from, and the furnace atmosphere to, opposing sides of the at least one partially open port.

5. A method for reducing alkali vapor corrosion of furnace refractory structures in a glass melting furnace having walls supporting a crown substantially enclosing an upstream melting zone and a downstream fining zone; a charging section in the melting zone; and at least one oxy-fuel fired burner disposed at the crown above the melting zone proximate the charging section to provide an oxy-fuel combustion region; wherein the furnace contains a regenerator or a recuperator having a plurality of ports, comprising:
    providing at least one gas inlet proximate to the oxy-fuel combustion region;
    introducing a first volume of gas, having no or a dilute partial pressure of alkali vapor, into the oxy-fuel combustion region;
    at least partially displacing a second volume of gas proximate the crown in the oxy-fuel combustion region, the second volume having a partial pressure of alkali vapor higher than the first volume;
    providing at least one gas outlet adapted to provide an exit for a volume of furnace atmosphere, optionally substantially equal to the first volume; providing at least partial blockage of at least one port of the regenerator or recuperator and providing at least a partial opening of one port of the regenerator or recuperator to provide the at least one gas inlet.

6. The method of claim 5 including replacing combustion from the at least one at least partially blocked port of the regenerator or recuperator and the at least one at least partially open port of the regenerator or recuperator by operating the at least one oxy-fuel burner.

7. The method of claim 5 wherein the providing at least a partial opening of at least one port of the regenerator or recuperator provides the at least one gas outlet.

8. The method of claim 7 including periodically reversing the direction of flow of the gas from, and the furnace atmosphere to, opposing sides of the at least one partially open port.

* * * * *